March 3, 1942.  W. L. ZINK ET AL  2,274,769
TRACTOR CULTIVATOR
Filed Oct. 19, 1939   4 Sheets-Sheet 1
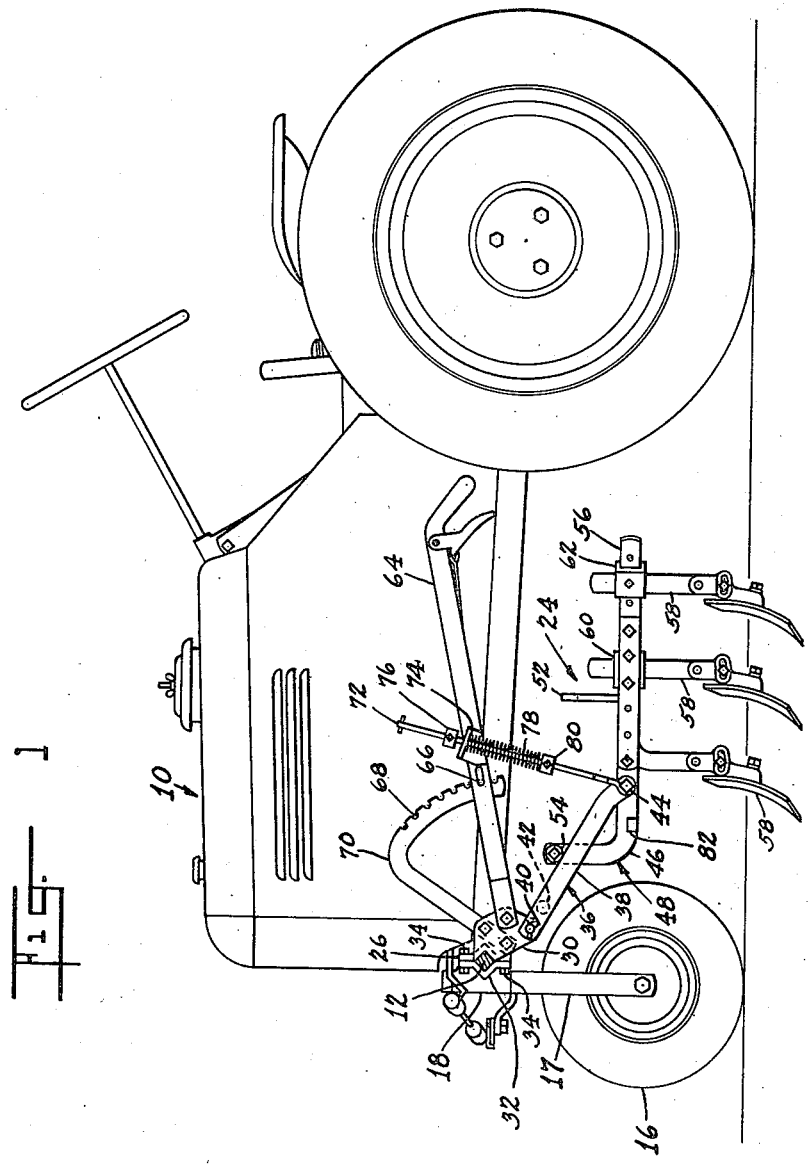
William L. Zink
Vernon O. Hauswirth
INVENTORS
BY *Eric S. Prime*
ATTORNEY.

March 3, 1942. W. L. ZINK ET AL 2,274,769
TRACTOR CULTIVATOR
Filed Oct. 19, 1939 4 Sheets-Sheet 2
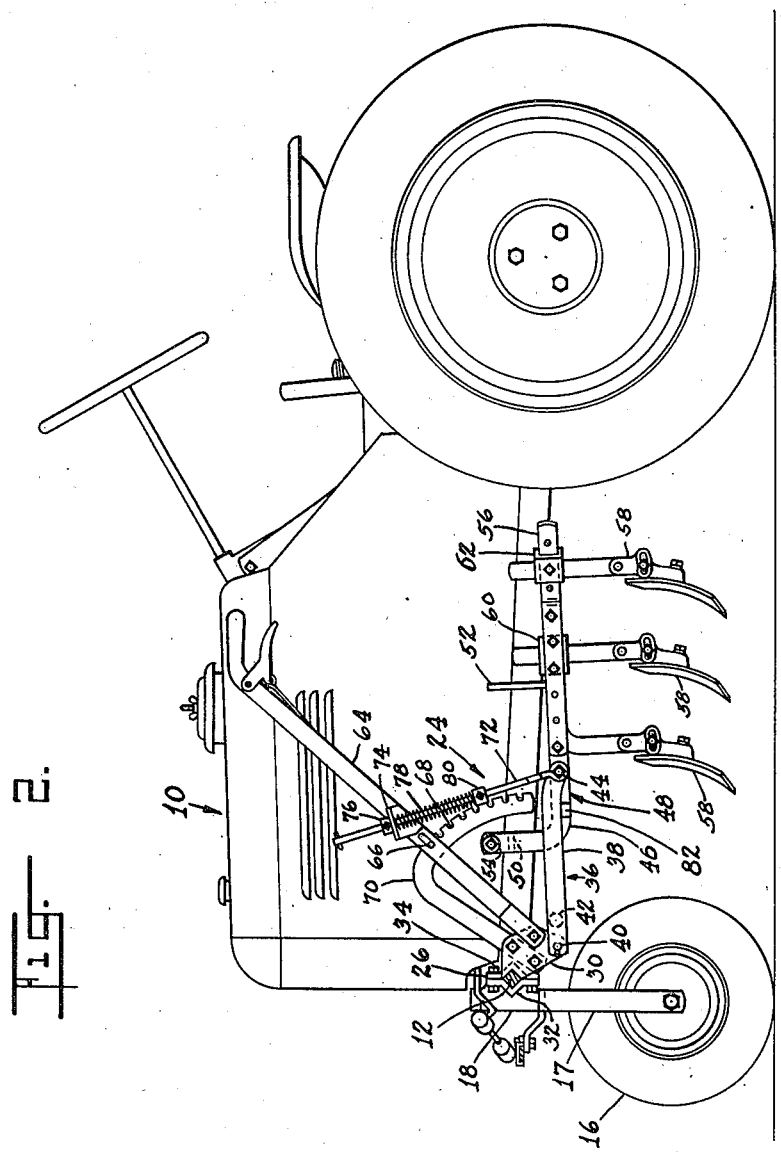
William L. Zink
Vernon O. Hauswirth
INVENTORS
BY Eric B. Prine
ATTORNEY.

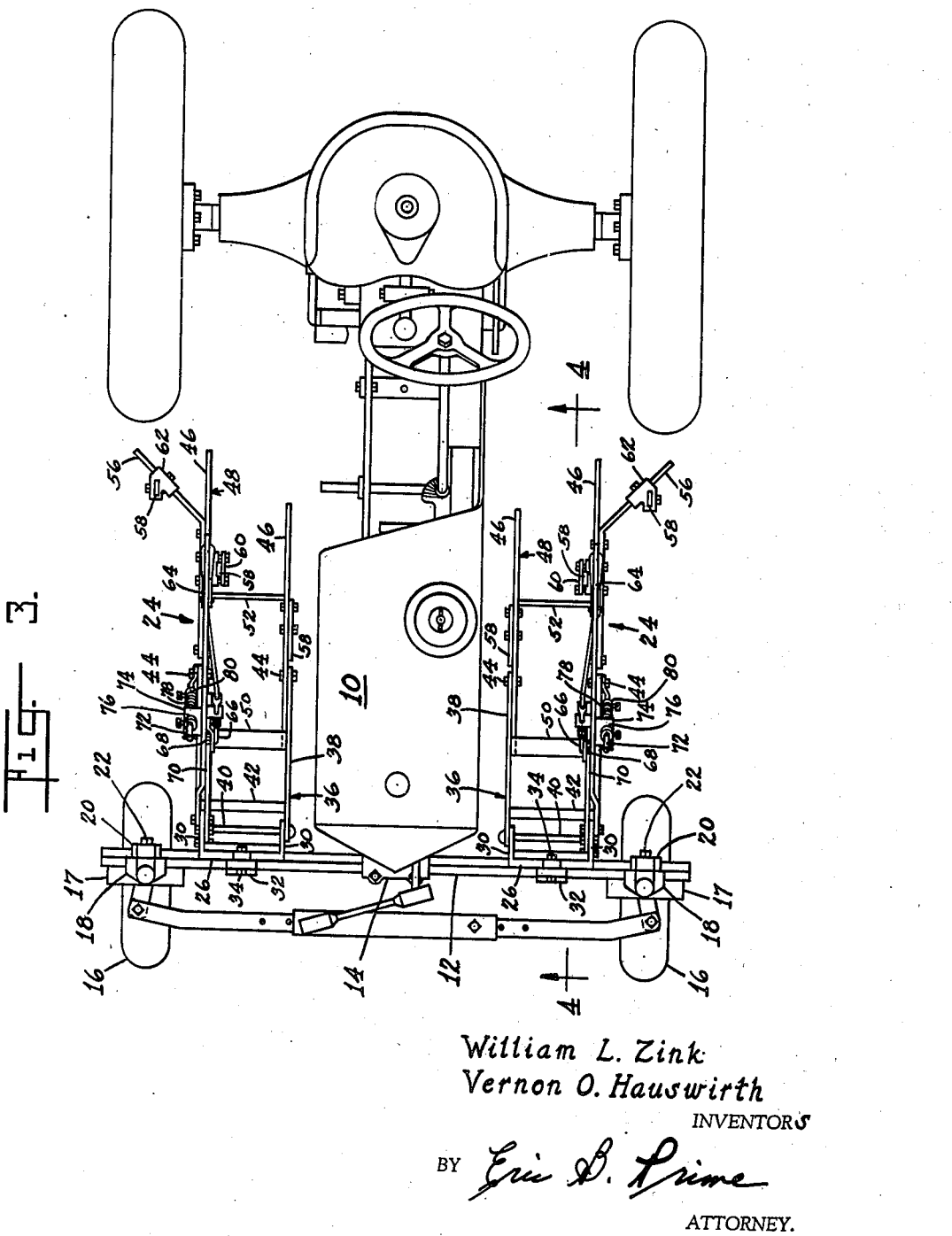

March 3, 1942.  W. L. ZINK ET AL  2,274,769.
TRACTOR CULTIVATOR
Filed Oct. 19, 1939  4 Sheets-Sheet 4
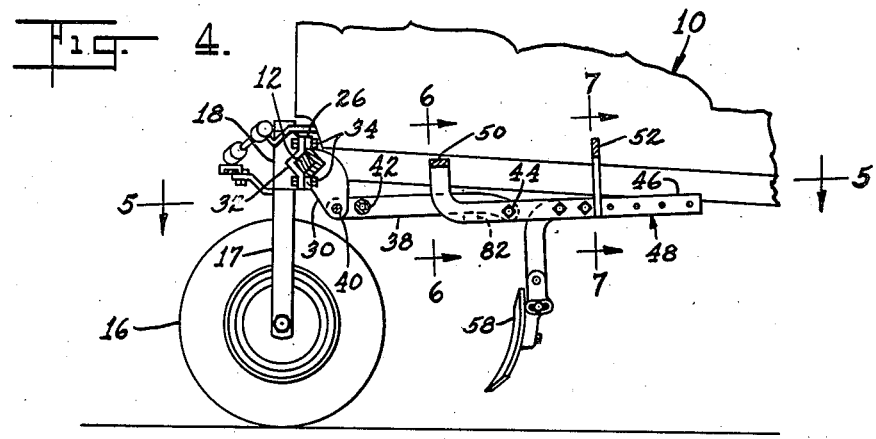
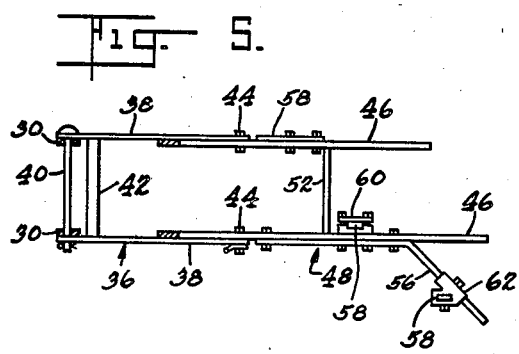
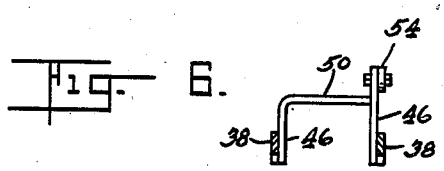
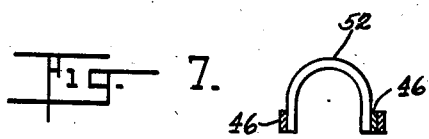
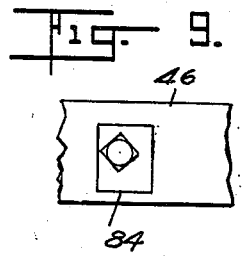
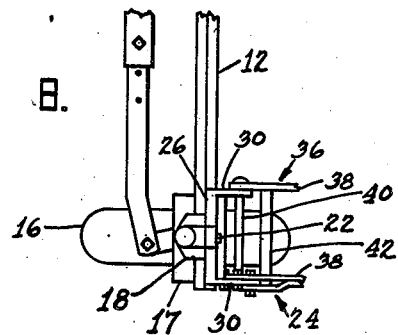
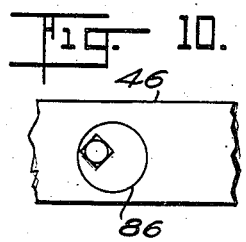
William L. Zink
Vernon O. Hauswirth
INVENTORS
BY *Eric B. Prime*
ATTORNEY.

Patented Mar. 3, 1942

2,274,769

UNITED STATES PATENT OFFICE 2,274,769

TRACTOR CULTIVATOR

William L. Zink, Plano, and Vernon O. Hauswirth, Kankakee, Ill., assignors to Sears, Roebuck and Co., Chicago, Ill., a corporation of New York Application October 19, 1939, Serial No. 300,102

4 Claims. (Cl. 97—47)

This invention relates generally to agricultural implements of the type adapted for use in combination with a tractor and more particularly to tractor-cultivators wherein the cultivator structure may be attached to the tractor and have ground working tools such as discs, sweeps, shovels, and the like, connected therewith for working the ground.

One of the primary objects of the present invention is to provide an improved and novel tractor-cultivator construction whereby the cultivator structure may be combined with the tractor structure.

Another important object of this invention is to provide an improved and novel cultivator attachment structure which is simple in construction and may be quickly and easily attached to or detached from the tractor.

A further object of the invention is to provide an improved and novel cultivator structure for attachment to a tractor which may be readily adjusted laterally to correspond to the spacing of the rows of plants to be cultivated and which may be quickly and easily operated from the driver's seat for moving the tools into and out of engagement with the ground.

Other objects and advantages will be apparent from the following description, reference being had therein to the accompanying drawings illustrating the invention, in which:

Figure 1 is a side elevation of a tractor having the cultivator structure attached thereto and positioned for having the tools carried thereby in cultivating positions;

Figure 2 is a view similar to Figure 1 showing the cultivator structure positioned for retaining the tools carried thereby out of engagement with the ground;

Figure 3 is a top plan view of the tractor, and cultivator structures attached thereto, a cultivator structure being shown positioned on each side of the tractor;

Figure 4 is a vertical sectional view taken substantially along the line 4—4 of Figure 3;

Figure 5 is a nearly horizontal sectional view taken substantially along the line 5—5 of Figure 4;

Figures 6 and 7 are vertical sectional views taken substantially along the lines 6—6 and 7—7, respectively, of Figure 4;

Figure 8 is a fragmentary plan view showing an alternative position of the cultivator structure relatively to the tractor structure; and Figures 9 and 10 are fragmentary elevational views showing alternative constructions of a part of the cultivator structure.

In the drawings illustrating the invention a tractor 10 is provided which preferably has the general construction of the tractor disclosed in the William L. Zink application for patent Serial No. 297,849 filed October 4, 1939.

The tractor 10 comprises a cross bar 12 mounted in a clamping member 14 which in turn is provided with a swivel connection in order that the cross bar 12 may oscillate vertically.

The cross bar 12 performs the double function of an axle and a tool supporting bar and is preferably substantially square or rectangular in cross section.

Front wheels 16 are mounted in wheel forks 17 which in turn are oscillatably mounted in wheel brackets 18 provided with angular recesses at their upper ends for receiving the cross bar 12.

Complementary bracket members 20 are similarly provided with recesses for receiving the cross bar 12 and are positioned on the opposite side of the cross bar relatively to the wheel brackets 18. The wheel brackets 18 are fastened to the cross bar 12 by means of screws 22 which extend through openings in the bracket members 20 and into threaded openings in the wheel brackets 18 for clamping the cross bar 12 between the brackets 18 and 20.

As shown in Figure 3, a pair of cultivator units 24 is mounted on the cross bar 12 and positioned on opposite sides of the tractor. Since each of the cultivator units 24 has the same construction, the following description of one will suffice for both.

Each of the cultivator units 24 comprises a bracket 26 formed for providing a V-shaped recess for receiving the cross-bar 12 and having a pair of spaced side portions or flanges 30 extending rearwardly relatively to the tractor.

The bracket 26 is connected to the cross bar 12 by means of a complementary bracket portion 32 positioned on the opposite side of the cross bar 12 relatively to the bracket 26 and similarly provided with a V-shaped recess for receiving the cross bar, the bracket 26 and the bracket portion 32 being connected together by bolts or screws 34 for clamping the cross bar 12 therebetween.

From the above it will be noted that the cultivator units may be connected to or disconnected from the cross bar 12, and may be adjustably positioned laterally on the cross bar to correspond to the spacing of the rows of plants to be cultivated, through the medium of the bolts 34.

As best shown in Figures 4, 5 and 8, a frame 36 comprising a pair of frame portions or bars 38 is swingably connected to the bracket 26 by means of a connecting pin 40 which extends through the frame bars 38 and the flange portions 30 of the bracket 26.

The frame bars 38 of the frame 36 are fixedly secured, such as by welding, to a tie bar 42, and have the rear ends thereof pivotably connected such as by bolts 44, to a pair of frame portions or bars 46 at intermediate points thereof, the frame bars 46 comprising a part of a floating frame 48.

The inside frame bar 46 is provided with a transversely extending front tie portion 50 attached to the outside frame bar 46 such as by welding, and an inverted U-shaped brace member 52 is also connected to the frame bars 46 by any suitable means such as welding.

It will be noted from Figures 1 and 6 that the outside frame bar 46 is extended upwardly above its connection to the tie portion 50 of the inside frame bar 46 for having a stop element 54 connected therewith for a purpose hereinafter described.

As shown in Figure 5, an extension arm 56 may be connected to the outer frame bar 46, and an extension arm, not shown, may also be connected to the inner frame bar 46, if so desired.

Ground working tools 58 are carried by the frame bars 46 and the extension bar 56 and may be connected directly to bars 46 and 56, as illustrated by the tool connected to the inside frame bar 46 in Figures 4 and 5, or the tools may be connected to clamps 60 or brackets 62 which in turn may be attached to the frame or extension bars 46 and 56, as also illustrated in Figures 4 and 5.

As shown in Figures 1, 2, and 3, the frames 36 and 48 are operable for moving the tools 58 into and out of engagement with the ground by means of a manually actuated lever 64 pivotally connected to the outer leg or flange 30 of the bracket 26. The lever 64 is provided with a manually operable catch element 66 receivable in notches 68 of an arcuate rack 70 which is fixedly connected to the outer flange 30 of the bracket 26.

The lever 64 is operatively connected to the frames 36 and 48 by means of a rod 72 which has an eye end portion for receiving the bolt 44 connecting the outer frame bars 38 and 46, and slidably extends through an angle bracket 74 fixedly connected to the lever 64.

A stop element or collar 76 is adjustably connected to the rod 72 above the angle bracket 74 by means of a set screw, and is engageable by the angle bracket 74 when the lever 64 is lifted, for lifting the frames 36 and 48 and the ground working tools 58.

A compression spring 78 is disposed on the rod 72 below the angle bracket 74 and may be retained in engagement with the angle bracket and have the pressure thereof varied by means of a collar 80 adjustably connected to the rod 72.

As best shown in Figures 1, 2 and 4, the frame bars 46 of the floating frame 48 are provided with outwardly projecting lugs 82 for engagement with the frame bars 38 of the frame 36 when the tools 58 are out of engagement with the ground, for definitely positioning the frame 48 relatively to the frame 36.

When the tools 58 are positioned for working the ground, as illustrated in Figure 1, the lever 64 is positioned so that the angle bracket 74 carried thereby tends to compress the spring 78 because of the resistance of the ground to the tools, and thereby yieldingly retains the tools in the ground. Should the tools, however, encounter an obstruction such as a rock, then the spring will permit the tools to ride over the obstruction without being broken. It will be noted that the stop 54 engages the outer frame bar 38 of the frame 36 for retaining the tools 58 in the ground and that the tools cannot come out of the ground unless the resistance of the ground overcomes the resistance of the spring 78 which may be adjusted to have the resistance desired.

It will also be noted that the engagement of the stop 54 with the frame bar 38 also tends to retain the floating frame 48 in a substantially horizontal working position.

Under certain conditions it may be desirable to provide means for adjusting the working position of the floating frame 48 relatively to the frame 36, in which case, in lieu of the stop 82, a rectangular stop element 84 may be provided, as shown in Figure 9, having the sides thereof spaced different distances from the center, or an eccentric stop element 86 may be employed, as shown in Figure 10, for providing the desired adjustment between the floating frame 48 and the frame 36.

When the tools 58 are to be disposed in their non-working positions out of engagement with the ground, as illustrated in Figure 2, the lever 64 is lifted, thereby causing the angle bracket 74 to engage the stop element 76 on the rod 72 for lifting the frames 36 and 48 as the lever is lifted.

When the lever 64 is lifted sufficiently to move the tools 58 out of engagement with the ground, the greater weight of the frame 48 rearwardly of the pivot bolts 44 causes the frame to turn about the pivot bolts 44 until the lugs 82 engage the side bars 38 of the frame 36, thereby resulting in the frame 48 being disposed in a nearly horizontal position when the tools are in their non-working positions as well as when the tools are in their working positions.

Under certain conditions of service it may be desirable to position the frames 36 and 48 so that the tools 58 will follow the wheels 16, in which case, as shown in Figure 3, the bracket portions 32 and the brackets 20 may be dispensed with and the brackets 26 may be connected directly to the wheel brackets 18 by the screws 22.

Thus it will be seen that an implement structure is provided which is simple in construction and readily adaptable for use under various conditions.

It is obvious that modifications and changes may be made without departing from the spirit of the invention and it is intended that the invention be limited only by the scope of the appended claims.

We claim:

1. An agricultural implement of the character described comprising a bracket adapted for being connected to a tractor, a frame swingably connected to the bracket, an extension frame pivotally connected to the first named frame, a ground working tool mounted on the extension frame, a manually operable lever movably connected to the bracket and operatively connected to the frames for moving the tool into and out of engagement with the ground, and stop means connected with one of the frames and adapted for engagement with the other frame for retaining the extension frame in a substantially horizontal position when the tool is in or out of engagement with the ground.

2. An agricultural implement of the character described comprising a bracket adapted for being connected to a tractor, a frame swingably connected to the bracket, an extension frame pivotally connected to the first named frame, a ground working tool mounted on the extension frame, a manually operable lever movably connected to the bracket and operatively connected to the frames for moving the tool into and out of engagement with the ground, and stop means connected with the extension frame and adapted for engagement with the first named frame when the tool is in or out of engagement with the ground for retaining the extension frame in a substantially horizontal position.

3. An agricultural implement of the character described comprising a bracket adapted for being detachably connected to a tractor, a frame movably connected to said bracket, an extension frame movably connected to the first-named frame, a ground working tool mounted on the extension frame, a manually operable lever movably connected to said bracket and operatively connected to said frames for moving said tool into and out of engagement with the ground, and interengageable means on said frames for retaining said frames in a predetermined relation when said tool is in one of its operative and inoperative positions.

4. An agricultural implement of the character described comprising a bracket adapted for being detachably connected to a tractor, a frame movably connected to said bracket, an extension frame movably connected to the first-named frame, a ground working tool mounted on the extension frame, a manually operable lever movably connected to said bracket and operatively connected to said frames for moving said tool into and out of engagement with the ground, and interengageable means on said frames for retaining said frames in a predetermined relation when said tool is in one of its operative and inoperative positions, said means including means for varying said relation.

WILLIAM L. ZINK.
VERNON O. HAUSWIRTH.